(12) United States Patent
Weiberle et al.

(10) Patent No.: US 7,857,400 B2
(45) Date of Patent: Dec. 28, 2010

(54) ELECTRIC, DECENTRALISED BRAKE SYSTEM IN A VEHICLE

(75) Inventors: Reinhard Weiberle, Vaihingen/Enz (DE); Udo Koegel, Sachsenheim (DE)

(73) Assignee: Robert Bosch GmbH, Stuttgart (DE)

( * ) Notice: Subject to any disclaimer, the term of this patent is extended or adjusted under 35 U.S.C. 154(b) by 193 days.

(21) Appl. No.: 10/549,720

(22) PCT Filed: Mar. 19, 2004

(86) PCT No.: PCT/DE2004/000567

§ 371 (c)(1),
(2), (4) Date: May 31, 2006

(87) PCT Pub. No.: WO2004/091988

PCT Pub. Date: Oct. 28, 2004

(65) Prior Publication Data

US 2006/0232128 A1      Oct. 19, 2006

(30) Foreign Application Priority Data

Apr. 10, 2003    (DE) ................................ 103 16 452

(51) Int. Cl.
*B60T 8/78* (2006.01)
*B60T 8/66* (2006.01)
(52) U.S. Cl. .................... 303/199; 303/20; 303/DIG. 9
(58) Field of Classification Search ................... 303/20, 303/122, 122.04, 199, 166, 167, DIG. 9; 701/70
See application file for complete search history.

(56) References Cited

U.S. PATENT DOCUMENTS

| | | | | |
|---|---|---|---|---|
| 3,693,114 A | * | 9/1972 | Kempf | ........................ 333/101 |
| 5,086,499 A | * | 2/1992 | Mutone | ........................... 714/3 |
| 5,975,250 A | * | 11/1999 | Brandmeier et al. | ..... 188/1.11 W |
| 6,029,108 A | | 2/2000 | Belschner | ...................... 701/70 |
| 6,189,981 B1 | * | 2/2001 | Niedermeier | ................. 303/20 |
| 6,209,966 B1 | * | 4/2001 | Mies | ............................... 303/3 |
| 6,299,261 B1 | | 10/2001 | Weiberle et al. | |

(Continued)

FOREIGN PATENT DOCUMENTS

DE      198 26 131        12/1999

(Continued)

OTHER PUBLICATIONS

Isermann, R., Brake-by-wire systems having a centralized brake pedal module are known for example from the laid open print DE 198 26 131 A1, the VDI report No. 1641 (2001), "Error-tolerant Components for Drive-by-wire Systems".

(Continued)

*Primary Examiner*—Melody M Burch
(74) *Attorney, Agent, or Firm*—Kenyon & Kenyon LLP

(57) ABSTRACT

An electrical, decentralized braking system includes at least four sensors for sensing the actuation of a brake actuating device; one braking module for each vehicle wheel, for acquiring sensor data and for controlling braking of the wheel; at least one first communication device with which all braking modules are connected to one another for the exchange of data; an electrical connecting device by which each sensor is connected to at least one braking module; and at least one further communication device for receiving and/or exchanging data between at least two braking modules of different sides of the vehicle.

7 Claims, 2 Drawing Sheets

U.S. PATENT DOCUMENTS

| | | | |
|---|---|---|---|
| 6,345,225 B1 | 2/2002 | Willimowski et al. | 701/70 |
| 6,402,259 B2 * | 6/2002 | Corio et al. | 303/20 |
| 6,540,309 B1 * | 4/2003 | Jordan et al. | 303/122.07 |
| 6,684,146 B1 * | 1/2004 | Hedenetz | 701/70 |
| 7,150,506 B2 * | 12/2006 | Nilsson et al. | 303/20 |

FOREIGN PATENT DOCUMENTS

| | | |
|---|---|---|
| DE | 199 18 995 | 11/2000 |
| DE | 199 371 56 | 2/2001 |
| JP | 2001-215201 | 8/2001 |
| JP | 2002-296897 | 10/2002 |
| JP | 2002-542112 | 12/2002 |

OTHER PUBLICATIONS

Stölzl, Stefan, "Error-tolerant Pedal Unit for An Electromechanical Braking System," published in the year 2000 by VDI-Verlag, ISBN 3-18-342612-9.

* cited by examiner

US 7,857,400 B2

ELECTRIC, DECENTRALISED BRAKE SYSTEM IN A VEHICLE

FIELD OF THE INVENTION

The present invention relates to an electrical, decentralized braking system in a vehicle, and in particular to an electrical, decentralized brake-by-wire system for a four-wheeled motor vehicle.

BACKGROUND INFORMATION

In brake-by-wire braking systems, which as a rule are not provided with a mechanical, hydraulic, or pneumatic backup system, particular emphasis must be placed on availability, i.e. a braking function, even in case of error. Brake-by-wire systems having a centralized brake pedal module are described, for example, in the published German patent document DE 198 26 131 A1, the VDI report no. 1641 (2001), "Error-tolerant Components for Drive-by-wire Systems," by R. Isermann, and the publication "Error-tolerant Pedal Unit for An Electromechanical Braking System," by Stefan Stölzl, published in the year 2000 by VDI-Verlag, ISBN 3-18-342612-9.

A main priority in systems having such a central module is the reliable acquisition of the actuation of the brake pedal (the parking brake will not be considered in the present context), as well as the distribution of the information concerning the brake actuation to decentralized intelligent wheel brake modules. The reliability of such a system is ensured on the one hand by a diversified and multiply redundant sensor design (see, e.g., brake pedals S1 to S3 according to FIG. 3) and on the other hand by a redundant processor and communication design (see first and second communication bus 14, 14' between central brake pedal module 15 and the four brake modules 10, each controlling a wheel 13), with the boundary condition of a multi-circuit on-board network.

In addition, the communication device or communication system is required to have a deterministic characteristic, from which the use of time-controlled communication systems, such as, for example, FlexRay, TTCAN, or TTP, results immediately. In this context, the brake pedal module and the communication system must have a fail-safe operational characteristic. In order to meet the requirement of a fail-safe operational characteristic in the case of simple errors, the brake pedal module must have at least three redundant processors as well as three redundant, diversified if necessary, sensors for the service brake. At least two redundant communication channels are required for the communication system.

Published German patent document DE 199 37 156 discloses an electromechanical braking system having a decentralized acquisition of the brake pedal actuation. This can be referred to as a distributed, decentralized pedal module functionality.

Within this electromechanical braking system design, shown with reference to FIG. 4, four diversified sensors S1 to S4 are provided for the acquisition of the actuation of a brake actuation device (not shown), respectively determining for example the pedal path and the pedal angle. Each of the sensors S1 to S4 is connected to exactly one wheel module 10 having a device 11 for determining a braking demand. Wheel modules communicate with one another via a system bus 14 and exchange the required sensor information or data, and, parallel thereto, calculate functional algorithms, agreeing on a protocol in such a way that in each wheel module 10 the same data, i.e. sensor actual values and sensor/function status, are present, and identical decisions can be made.

Consequently, in this way a symmetrical, decentralized system architecture is provided in which the required fail-safe operational approach of the central pedal module according to FIG. 3 is here (i.e. according to FIG. 4) reproduced via the redundancy of intelligent wheel modules 10, 11. However, if a common mode error now occurs in communication system 14, for example due to a mechanical wiring harness breakage in the area of the wheel housing caused by a foreign influence, e.g. during off-road operation, this will lead unavoidably to a total loss of communication, in particular given a bus topology of communication system 14. In such a case, each wheel module 10 will then have access only to one sensor value, which however will no longer be able to be sufficiently tested for plausibility. This can result in differing braking forces being applied to the different wheels 13 of the vehicle, resulting in a yawing moment, and thus in pulling to one side of the vehicle. Already in the case of a single error, this represents a significant loss of safety, independent of the backup management strategy.

SUMMARY

In comparison with the known approach, the electrical, decentralized braking system according to the present invention has the advantage that, even after a common mode error or after the occurrence of two simple errors, at least a part of the wheel modules can test for plausibility of sensor values through comparison with at least one additional sensor value, thus ensuring safety against a second error.

In this way, increased reliability and availability of the service brake is ensured in case of error, which is required in pure brake-by-wire systems without mechanical/hydraulic backup systems for a safe trip to a workshop.

The underlying idea of the present invention is essentially that at least a part of the wheel modules can test for plausibility of sensor values through comparison with at least one additional sensor value even after a common mode error or after the occurrence of two simple errors.

In other words, an electrical, decentralized braking system is provided with: at least four sensors for acquiring the actuation of a brake actuating device; one brake module per brakable wheel of the vehicle for acquiring sensor data and controlling a braking device of a corresponding wheel; at least one first communication device with which all braking modules are connected to one another for the exchange of data; and an electrical connection device by which each sensor is connected at least to one brake module, the braking system having at least one additional communication device for receiving and/or exchanging data between at least two wheel modules of opposite sides of the vehicle.

According to an example embodiment of the present invention, the second communication device is constructed identically to the first communication device, and each sensor is connected to a second wheel module of the opposite side of the vehicle. In this way, the necessary and reliable test for plausibility of the sensor values can take place via the additional duplex system of the two local sensors, even when a common mode error has occurred in the communication system, i.e., both communication devices or communication lines fail.

According to an example embodiment of the present invention, a front wheel module of one side of the vehicle is connected to a rear wheel module of the other side of the vehicle via a second communication device, and a front wheel module of the other side of the vehicle is connected to a rear wheel module of the one side of the vehicle via a third communication device for exchanging data. This has the advantage that after the occurrence of two independent simple errors affecting the communication devices, or one common mode error (e.g. due to mechanical foreign influence in the area of the wheel housing), a communication, and thus a test for plausibility, of the sensor values is still possible between at least two wheel braking modules on opposite sides of the vehicle.

According to a further example embodiment, more than four sensors, allocated to the wheel modules in pairs, are provided for acquiring the actuation of the brake actuating device. This is advantageous because it provides an additional increase in redundancy at a low expense.

According to a further example embodiment, the communication devices are formed by serial bus systems. This advantageously permits the use of known communication platforms.

DETAILED DESCRIPTION

Figure 1:
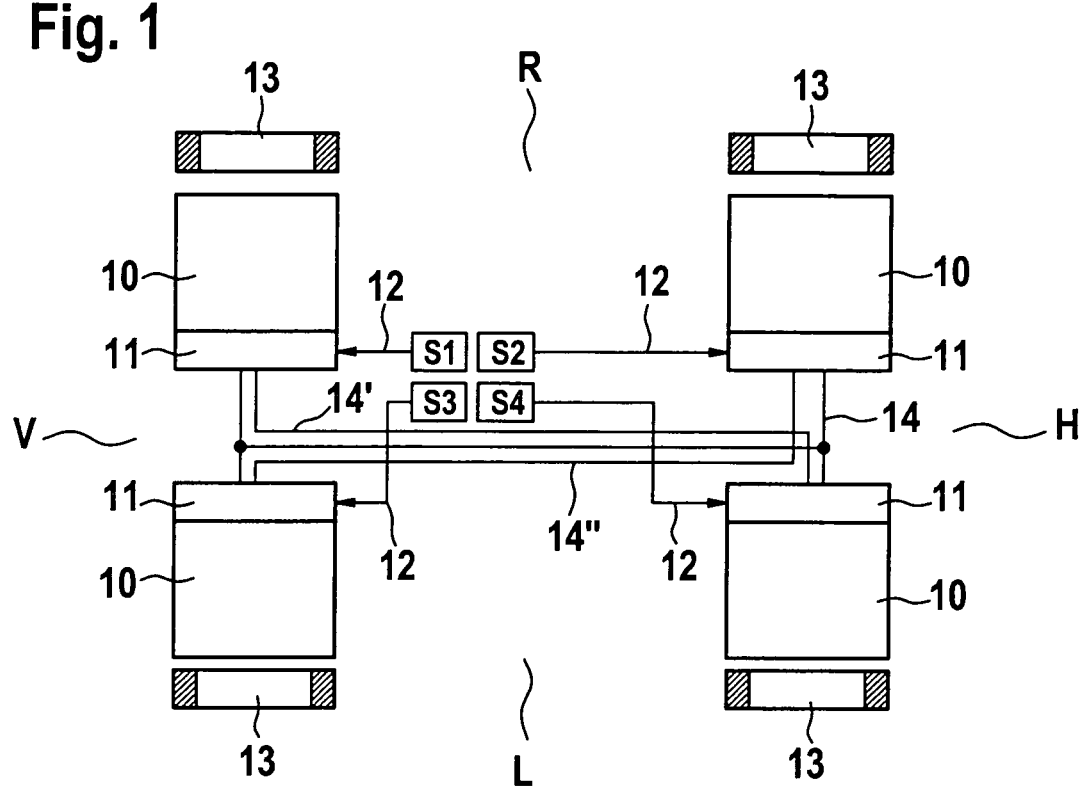
FIG. 1 shows a schematic block diagram of a braking system according to a first example embodiment of the present invention.

In FIGS. 1-4, identical reference characters designate identical or functionally identical components.

FIG. 1 schematically shows a block diagram of an electrical braking system that has four sensors S1, S2, S3, and S4. The four sensors S1 to S4 determine an actuation of a brake actuating device (not shown), such as, for example, a brake pedal, that is actuated by a user of the vehicle. The four sensors S1 to S4 all detect the same parameters, such as, for example, a pedal path and a pedal angle: Intelligent wheel braking modules 10, which are provided with a device 11 for determining the brake demand or a desired braking (brake demand distribution), are each connected with one of the four sensors S1 to S4 via an electrical line 12. Four wheels 13 are connected to wheel braking modules 10 or wheel braking devices (not shown) connected therewith.

Moreover, wheel braking modules 10 are all connected to one another via a communication device 14 that permits an exchange of data between wheel braking modules 10. According to the example embodiment in FIG. 1, a second and a third communication device 14' and 14" are additionally provided, such that each of these communication devices 14', 14" connects a wheel module 10 of one side of the vehicle, e.g., right or left, with a wheel braking module 10 of the other side of the vehicle, in order to exchange data. For example, the front right wheel RV is connected to the rear left wheel LH and conversely, so that a diagonally opposite connecting is ensured. First, second, and third communication devices 14, 14', and 14" are a serial bus system, for example.

Communication device 14 enables communication among all four wheel braking modules 10, and also with additional control devices, such as, for example, ABS or VDM control modules. Via this communication device 14, the pedal sensor values of sensors S1 to S4 of the four wheel braking modules 10 are exchanged. In addition, via the second and third communication devices, i.e., two braking circuit data buses 14' and 14", the pedal sensor values of the two associated wheel braking modules 10VL (front left), HR (rear right); VR (front right), HL (rear left) are mutually exchanged. This creates the possibility of monitoring, via the two braking circuit data buses 14', 14", of the data sent via the first communication device 14.

After the occurrence of two independent simple errors affecting communication devices 14, 14', 14", or the occurrence of a common mode error, e.g. due to mechanical foreign influence in the area of the wheel housing resulting in breakage of the communication bus connections to the corresponding wheel, one communication device 14' or 14" is thus still intact, so that a test of plausibility of the pedal sensor values of sensors S1 to S4 is still possible between at least two wheel braking modules 10 VR, HL or VL, HR. A system of this sort therefore has the possibility of switching off wheel braking modules 10 that can no longer communicate via a communication device 14, 14', 14", in order to avoid undesirable or unmatched braking forces, and thus a possible pulling of the brakes of the vehicle. This results in increased safety, both in the case of a simple error and also in the case of a double simple error, or of a common mode error.

Figure 2:
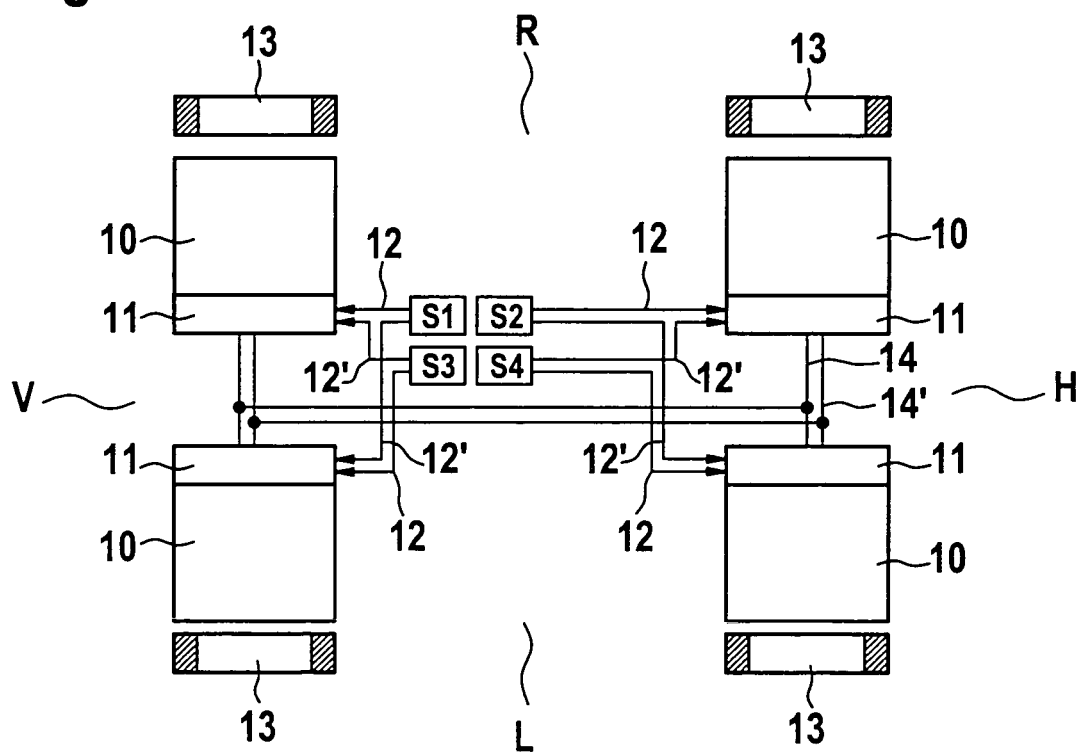
FIG. 2 shows a schematic block diagram of a braking system according to a second example embodiment of the present invention.
Figure 3:
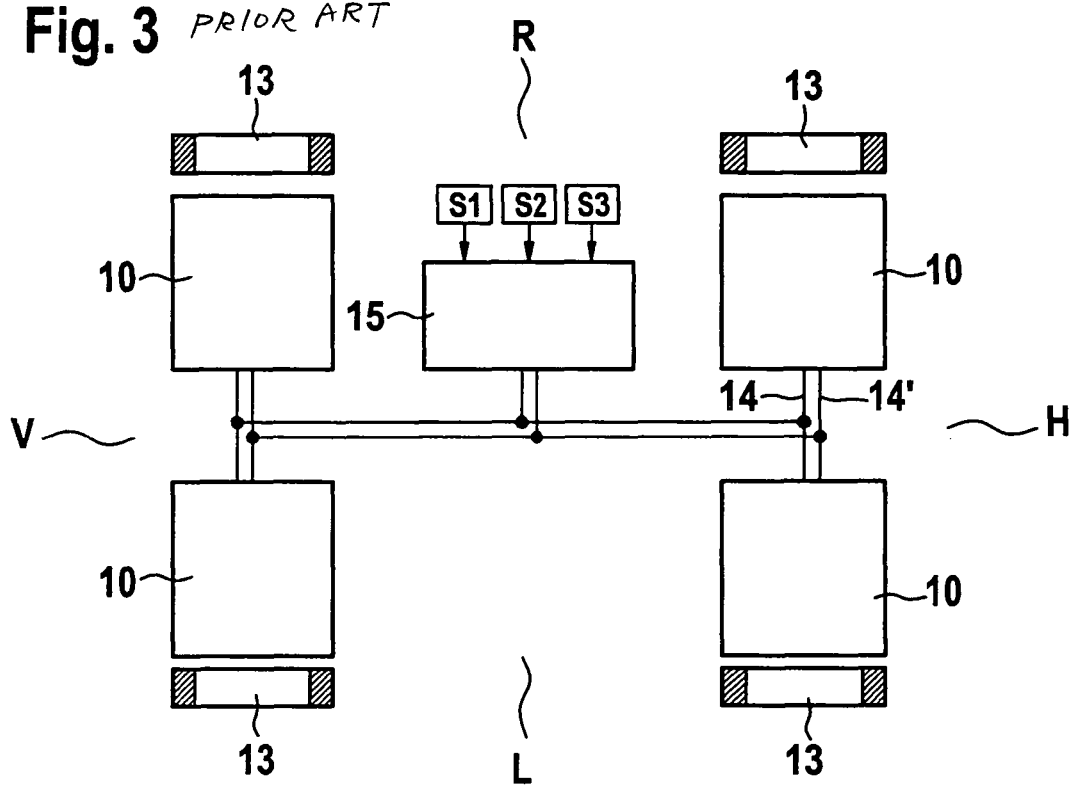
FIG. 3 shows a schematic block diagram of a conventional braking system.
Figure 4:
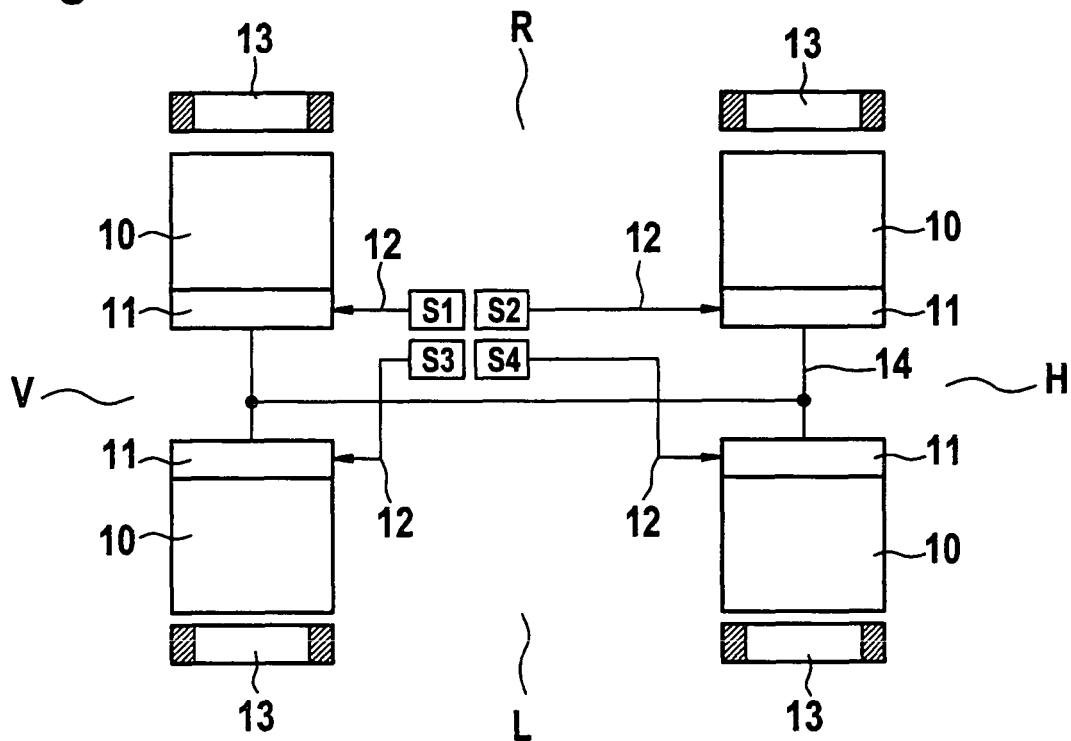
FIG. 4 shows a schematic block diagram of an additional conventional braking system.

FIG. 2 shows a schematic block diagram of an electrical braking system according to a second example embodiment of the present invention. The embodiment according to FIG. 2 is distinguished from the embodiment explained with reference to FIG. 1 by the modified communication or connection structure between individual wheel braking modules 10. As in the first embodiment, the braking system according to the second embodiment also has a communication device 14, e.g., a serial data bus, that connects all wheel braking modules 10 of wheels 13 to one another. In addition, a second communication device 14', redundant to the first communication device 14, is provided that likewise connects all wheel braking modules 10 to one another. Besides electrical connections 12 between sensors S1 to S4 for acquiring the actuation of a brake actuating device (not shown) and wheel braking modules 10 according to FIG. 1, in FIG. 2 additional electrical connections 12' are provided. Electrical connections 12' extend from a respective sensor, e.g. S2, to a wheel braking module 10 that is situated axially next to the wheel braking module 10 that is connected to the electrical connection 12 of the sensor S2. That is, each of sensors S1 to S4 is electrically connected, via connection 12 and connection 12', to two wheel braking modules 10 situated on one axle.

The decentralized system for acquiring a user brake request according to the second example embodiment thus has exactly two of the four sensors S1 to S4 connected to each of the four wheel modules. Alternatively, embodiments are also conceivable in which more than four physical sensors S1, S2, . . . , are allocated in pairs to the four wheel braking modules 10. The advantage of the proposed second example embodiment is that even after the occurrence of two independent simple errors or the occurrence of a common mode error in communication system 14, 14", wheel braking modules 10 are indeed no longer able to communicate with one another, but a necessary and reliable test for plausibility of the sensor values of sensors S1 to S4 can nonetheless take place via the additional redundant system of the two local sensors S1 to S4. In this way, it is possible to safely brake wheel braking modules 10 that can no longer communicate with one another via a communication system 14, 14'. This results in increased safety in the case of failure of the communication system, both in the case in which two simple errors occur and in the case of a common mode error.

Although the present invention has been explained above on the basis of exemplary embodiments, it is not limited to these, but rather can be modified in a multiplicity of ways.

Although it has been described for vehicles having two axles, the present invention can also be correspondingly applied to multi-axle vehicles, such as, for example, three-axle trucks. In addition, it is likewise conceivable to realize connections 12, 12' between sensors S1 to S4 so as to be not only unidirectional (as is indicated by the arrows in the drawings) but rather, e.g., for the second embodiment, so as to enable bidirectional communication, via a corresponding sensor, between the two wheel braking modules 10 connected to the sensor. Under this precondition, it would also be possible to realize a diagonal cross-connection of wheel braking modules 10 via connecting devices 12, 12' between wheel braking modules 10, in contrast to the described connection of wheel braking modules 10 of one axle.

What is claimed is:

1. A decentralized electrical braking system, comprising:
   at least four sensors for sensing an actuation of a brake actuating device;
   at least four wheel-braking modules, each wheel-braking module being assigned to a corresponding vehicle wheel and acquiring sensor data and controlling braking of the corresponding vehicle wheel;
   at least one first communication device connecting all four wheel-braking modules to one another for exchange of data;
   an electrical connecting device for connecting each sensor to at least one wheel-braking module; and
   at least one of a second communication device and a third communication device for facilitating at least one of receiving and exchanging data between at least two wheel-braking modules associated with opposite lateral sides of the vehicle, wherein the first, second and third communication devices are discrete and are not directly connected to each other,
   wherein the second communication device connects only a front wheel-braking module of a first lateral side of the vehicle to only a rear wheel-braking module of a second lateral side of the vehicle, and the third communication device connects only a front wheel-braking module of the second lateral side of the vehicle to only a rear wheel-braking module of the first lateral side of the vehicle.

2. A decentralized electrical braking system, comprising:
   at least four sensors for sensing an actuation of a brake actuating device;
   at least four wheel-braking modules, each wheel-braking module being assigned to a corresponding vehicle wheel and acquiring sensor data and controlling braking of the corresponding vehicle wheel;
   at least one first communication device connecting all four wheel-braking modules to one another for exchange of data;
   an electrical connecting device for connecting each sensor to at least one wheel-braking module; and
   at least one of a second communication device and a third communication device for facilitating at least one of receiving and exchanging data between at least two wheel-braking modules associated with opposite lateral sides of the vehicle, wherein the first, second and third communication devices are discrete,
   wherein the at least one of the second communication device and the third communication device is configured identically with respect to connections to the at least four wheel-braking modules as the first communication device, and each sensor is directly connected by electrical lines to only two wheel-braking modules associated with opposite lateral sides of the vehicle, on the same axle.

3. The braking system as recited in claim 2, wherein two sensors are connected to each wheel-braking module.

4. The braking system as recited in claim 1, wherein the first, second and third communication devices are serial bus systems.

5. The braking system as recited in claim 1, wherein sensor data of the sensors are exchanged via the first, second and third communication devices.

6. The braking system as recited in claim 1, wherein each wheel-braking module has a device for determining an actuation strength of the brake actuating device.

7. The braking system as recited in claim 1, wherein the braking system is a passenger vehicle braking system having four brakes for four wheels.

* * * * *